Dec. 5, 1933. M. H. GOLDMAN 1,937,515
COLLAR BUTTON
Filed May 26, 1932

Inventor:
Max H. Goldman.
By Brown, Jackson, Boettcher & Dienner
Attys

UNITED STATES PATENT OFFICE 1,937,515

COLLAR BUTTON

Max H. Goldman, Chicago, Ill.

Application May 26, 1932. Serial No. 613,618

1 Claim. (Cl. 24—91)

This invention relates to improvements in collar buttons and contemplates a button having a hollow, thin-walled head, a hollow, thin-walled base, and an extendible and contractible connecting shank made up of a single piece of coiled spring wire.

The head and the base each have an inner wall provided with an opening and the shank has one or more convolutions at each end, of a diameter greater than the diameter of the openings in the inner walls of said head and base. These end convolutions are threaded through these openings into the interiors of the head and base and are secured within the head and base by solder or other suitable means. The end convolutions of the shank being larger than the openings in the inner walls of the head and base will, upon being threaded into position within the head and base, resist and prevent axial separation of these parts from the shank of the button.

The invention is illustrated in the accompanying drawing, in which.

Figure 1:
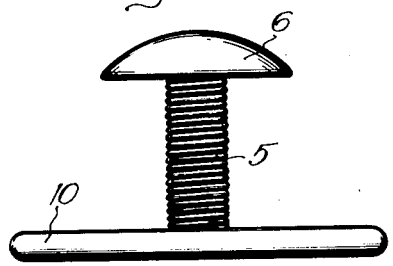
Figure 1 is an enlarged side elevational view of a button embodying my present invention.

In carrying out my invention I make up the shank 5 of a single piece of coiled spring wire. The wire and the coiling are of a character to give the shank or post 5 the desired rigidity and at the same time to permit extension and contraction of the shank for the purpose of self-adjustment to different neck-band thicknesses and to hold the head and base snugly to the neck-band, regardless of whether the button is used at the back, where there is only one neck-band thickness, for example, or at the front, where the overlapping front ends of the neck-band result in the disposition of at least two thicknesses between the head and base of the button.

The head 6 is hollow and thin-walled, with the outer wall rounded or of other suitable or preferred form at 7, and the inner wall 8 is turned in and provided centrally thereof with an opening 9. The head is preferably formed of metal, solid or plated as desired, but other materials may be employed within the scope of the appended claim.

The base 10 is likewise preferably formed of metal, solid or plated as desired, and it, too, may be of other material within the scope of the present invention. The base 10 is of flat, circular form, but the shape and form of the same may vary widely, as may the shape and form of the head 6. The outer, or bottom wall of the base 10 is indicated at 11 and the inner or top wall is turned in and provided centrally thereof with an opening 12.

Figure 3:
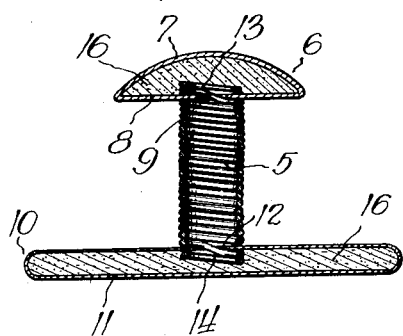
Figure 3 is a sectional view taken on the line 3—3 of Figure 2.

The extendible and contractible coiled spring wire shank 5 has convolutions 13 and 14 at its opposite ends, of a diameter greater than the diameter of the respective openings 9 and 12, and these end convolutions are threaded through the openings 9 and 12 into position within the hollow interiors of the head 6 and base 10, as shown in Figure 3. The end convolutions 13 and 14 being larger than the openings 9 and 12, connect the head 6 and the base 10 to the opposite ends of the shank 5 by their engagement with the inner walls of the head and base. Solder 16 or other suitable means is preferably introduced into the hollow interiors of the head 6 and base 10 and additionally secure the head and base upon the opposite ends of the shank of the button.

Figure 2:
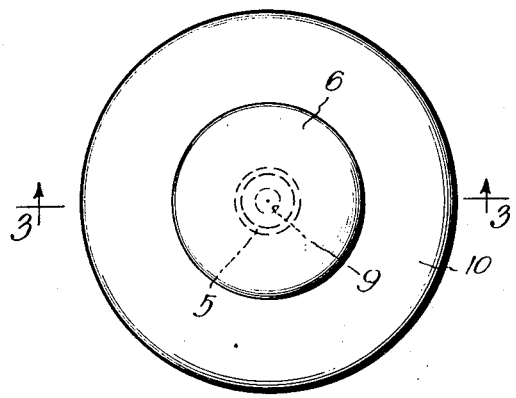
Figure 2 is a top plan view of the same.

In the embodiment of Figures 1, 2 and 3, the shank 5 is of substantially uniform diameter from end to end, this diameter being larger than the diameter of the openings 9 and 12, for the purpose already described.

Figure 4:
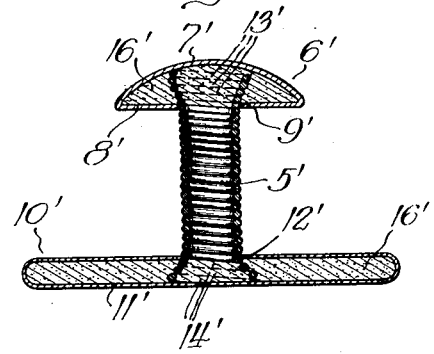
Figure 4 is a sectional view similar to Figure 3 and showing a modification.

The embodiment of Figure 4 is similar to the embodiment of Figures 1 to 3, inclusive, and corresponding parts are indicated by primed reference numbers corresponding to the reference numbers in Figures 1 to 3. In this case, however, the opposite ends 13' and 14' are enlarged to diameters greater than the diameters of the openings 9' and 12', but the shank 5' between these enlarged ends is of reduced diameter. In this form I have also shown a greater number of convolutions 13' within the hollow head 6' and a greater number of convolutions 14' within the hollow base 10'. The shape and form of the parts may vary as before, and the enlarged ends of the shank 5' are secured by solder 16' or other suitable means within the hollow interiors of the head 6' and base 10'.

Figure 5:
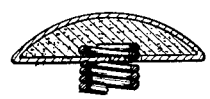
Figure 5 is a fragmentary sectional view of another modification.

In the embodiment of Figure 5 the opening 9" is positioned eccentric of the head 6" a distance substantially equal to the radius of the shank 5" and is relatively narrow, to position and maintain the desired lateral relation of the shank 5" and head 6".

I claim:

As an article of manufacture, a collar button having a hollow thin-walled base having an imperforate bottom wall and a top wall provided with an opening disposed at the axis of said base, an extendible and contractible shank extending through the opening in the top wall of the base of the button and made up of a single piece of coiled spring wire, an enlargement formed at the lower end of said shank by coiling the wire out from the lower end of the shank to a diameter greater than the diameter of the shank and greater than the diameter of the opening in the top wall of the base, said coiled enlargement being disposed between the top and bottom walls of the base and securing the base to the shank, and a head at the upper end of said shank, said head being enlarged to a diameter greater than the shank and less than the diameter of the base.

MAX H. GOLDMAN.